United States Patent
Charbonnier et al.

[15] 3,680,072
[45] July 25, 1972

[54] STORAGE BATTERY MONITORING APPARATUS

[72] Inventors: Gerard Charbonnier, Marolles-en-Hurepoix; Gerard Gauthier, Montrouge, both of France

[73] Assignee: Compagnie Generale D'Automatisme, Paris, France

[22] Filed: Jan. 26, 1971

[21] Appl. No.: 109,918

[52] U.S. Cl. .................................340/249, 320/43, 320/48, 324/29.5
[51] Int. Cl. .........................................G08b 21/00, H02j 7/00
[58] Field of Search ............320/43, 48; 324/29.5; 136/182; 340/249

[56] References Cited
UNITED STATES PATENTS

| | | |
|---|---|---|
| 3,405,352 | 10/1968 | Wondra...........................324/29.5 |
| 3,018,432 | 1/1962 | Palmer............................340/249 |
| 3,593,099 | 7/1971 | Scholl.............................340/249 |
| 3,517,294 | 6/1970 | Ruben.............................320/43 X |
| 3,483,393 | 12/1969 | Gutzmer et al. ...............320/48 X |
| 3,500,167 | 3/1970 | Applegate et al..............340/249 X |

Primary Examiner—John W. Caldwell
Assistant Examiner—Scott F. Partridge
Attorney—Sughrue, Rothwell, Mion, Zinn & Macpeak

[57] ABSTRACT

An apparatus for monitoring the charge of a storage battery which gives an indication of the state of the charge. The charge is monitored by placing a current pulse through the internal resistance of the battery and monitoring the change in voltage at the terminals of the battery. The apparatus also includes a recharging circuit for recharging the battery when its charge falls below a predetermined level and a control circuit for stopping the recharging of the battery when the battery becomes fully charged.

12 Claims, 2 Drawing Figures

INVENTORS
GÉRARD CHARBONNIER
GÉRARD GAUTHIER

BY Sughrue, Rothwell, Mion,
Zinn & Macpeak
ATTORNEYS

3,680,072

STORAGE BATTERY MONITORING APPARATUS

BACKGROUND OF THE INVENTION

Field of the Invention

The present invention concerns apparatus for monitoring the state of charge of a storage battery.

The invention is intended to provide apparatus for monitoring the state of charge of a storage battery attached to a load so as to detect, with a certain safety margin, the charge state beyond which the storage battery should no longer be used if satisfactory operation is required.

The state of charge of a storage battery is indicated by its internal resistance $r$. Thus the charge state can be monitored by determining the value of its internal resistance. If the electromotive force of the storage battery is E and the storage battery provides a current $i$, the voltage between its poles $V_1$ is:

$$E = V_1 + ri$$

If, during a short time interval, a current I is superimposed on the current $i$, a voltage $V_2$ is obtained between the poles and;

$$E = V_2 + r(I + i)$$

Thus the variation $\Delta V$ in the voltage between the storage battery poles is:

$$V_1 - V_2 = \Delta V = rI$$

Thus, knowing $\Delta V$ and $I$, $r$ can be determined. Experimental observations provide a limit value for $r$, and thus for $\Delta V$, beyond which the storage battery must be recharged.

SUMMARY OF THE INVENTION

In accordance with the present invention, apparatus for monitoring the state of charge of a storage battery comprises first and second terminals which are connected to the respective poles of a storage battery while the storage battery is connected to its load circuit. The apparatus further comprises drive circuitry connected across the first and second terminals and arranged to apply current pulses of predetermined duration to the storage battery at predetermined regular intervals and sensing circuitry connected across the first and second terminals to sense the voltage between them and to evaluate a first signal significant of the difference between this voltage before and during each current pulse. The apparatus also includes comparator circuitry connected to receive the first signal and to compare it with a reference signal provided by reference circuitry, the output signal of the comparator circuitry during each current pulse being indicative of the state of charge of the storage battery.

The invention provides apparatus which passes a current pulse of amplitude I at regular intervals, these pulses being of relatively short duration. The apparatus determines the variation $\Delta V$ of the voltage between the first and second terminals produced by each current pulse, and compares this with a predetermined reference value. The apparatus may be arranged to respond to the detection of complete discharge of the storage battery either by disconnecting the storage battery from its load circuit and/or by connecting a recharging device.

It is simpler to shunt the storage battery with a predetermined load resistance for obtaining the predetermined current rather than generating a predetermined current. Because of slight variations in the voltage between the poles of the storage battery especially in the case of a lead-acid storage battery, depending on its state of charge, the amplitude of the current pulses obtained will not be completely constant, but the evaluation of $\Delta V$ will be much more constant.

The invention will now be described in more detail, by way of example only and with reference to the accompanying diagrammatic drawing.

DESCRIPTION OF THE PREFERRED EMBODIMENT

Figure 1:
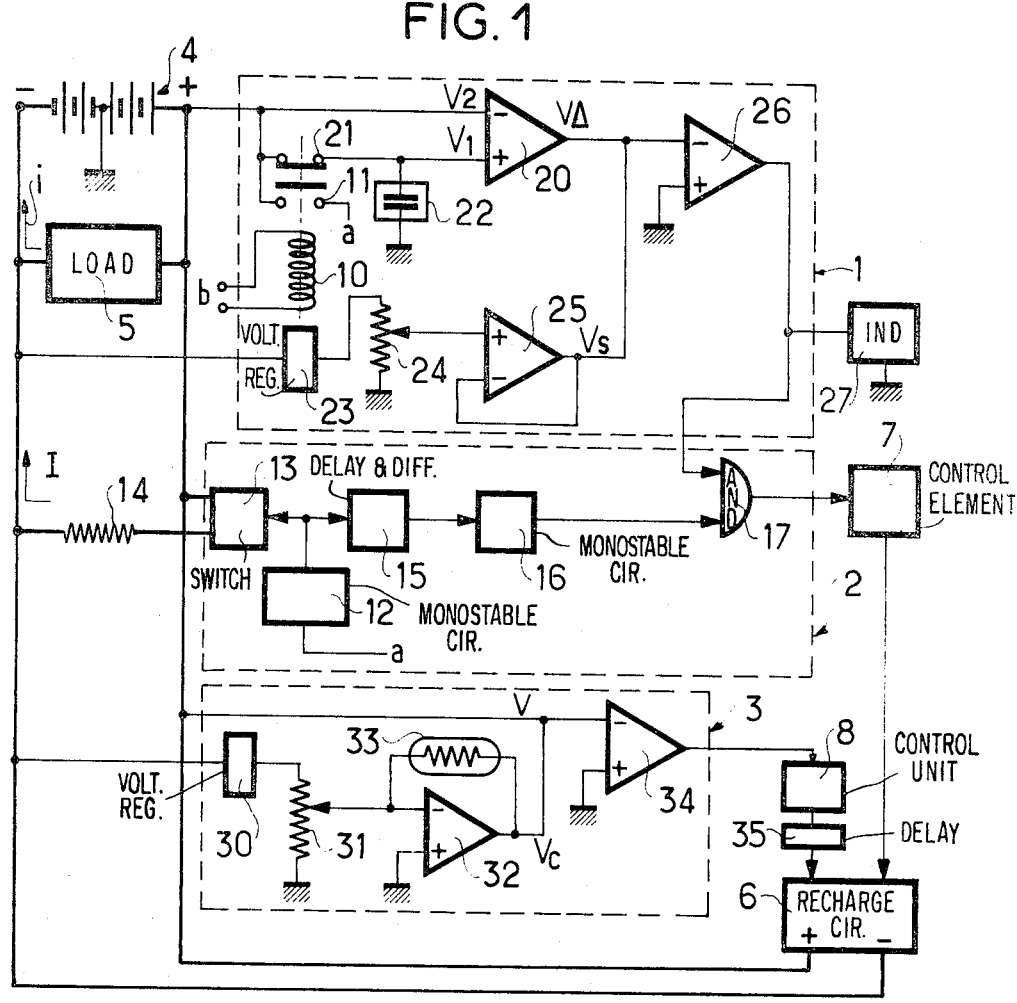
FIG. 1 is a block diagram of apparatus for monitoring and controlling the state of charge of a storage battery.

Referring to FIG. 1, the apparatus is divided into three main subsections; a state of charge monitor 1, logic circuitry 2, and a storage battery recharging control circuit 3.

The storage battery 4 has six cells, the point electrically mid-way between its positive and negative poles being connected to ground. A load circuit 5 is connected to the storage battery poles. Also connected between the poles of the storage battery 4 is a recharging circuit 6. Recharging is started by an element 7 and stopped by an element 8, as will be further explained below. The element 7 is controlled by the combined outputs of sub-sections 1 and 2, whereas the element 8 is controlled by the output of sub-section 3.

The storage battery 4 normally drives a current $i$ through the load circuit 5. Using the apparatus of this invention, a short current pulse of amplitude I is passed through the storage battery. The resulting change in the voltage between the storage battery poles is monitored, providing an indication of the state of charge of the storage battery, as already explained. The apparatus provides a sequence of such current pulses at predetermined regular intervals, and provides an output signal indicative of the state of charge during each such current pulse.

First and second terminals of the apparatus are connected respectively to the negative ($-$) and positive ($+$) poles of the storage battery.

The first sub-section 1 includes a first operational amplifier 20 with a first input connected directly to the positive pole of the storage battery 4. The second input is connected to the same pole of the storage battery through a switch 21 which is closed except during each current pulse. The second input of the amplifier 20 is also connected to a voltage storing device in the form of a capacitor 22 connected between the second input of the amplifier and ground.

A voltage regulator 23 is connected to the negative pole of the storage battery 4 and provides at its output a constant voltage which is applied to a voltage divider 24. A portion of the voltage tapped off by the divider 24 is applied to a first input of a second operational amplifier 25 operating as an impedance converter. The output of the second amplifier 25 is connected to a first input of a third operational amplifier 26, this input also being connected to the output of the first operational amplifier 20. The second input of amplifier 26 is connected to ground. The third amplifier 26 acts as a saturated comparator, and its output is connected to an indicator device 27 and to the first input of an AND-gate 17 of sub-section 2.

The output voltage of the third amplifier 26 has one of two possible values, depending on whether the output voltage $\Delta V$ of the first amplifier 20 is greater than or less than the output voltage $V_s$ of the amplifier 25. The indicator device 27 is triggered when $\Delta V$ is greater than $V_s$.

The second sub-section 2 includes a monostable circuit 12 whose input is connected through a switch 11 of the first sub-section 1 to the positive pole of the storage battery 4. (This connection has been interrupted in the figure, for the sake of clarity, and is the connection symbolized a—a.) The switches 11 and 21 of sub-section 1 are operated synchronously by a coil 10 which is energized at moments synchronous with the start of each current pulse.

The output of monostable circuit 12 is applied to the input of a switching element 13, which, when actuated, connects a shunt resistance 14 in parallel with the load circuit 5 of the storage battery 4.

The output of the monostable circuit 12 is also applied to the input of a circuit 15 which delays the output by a predetermined amount less than the current pulse duration and differentiates its leading edge to provide a short pulse.

Figure 2:
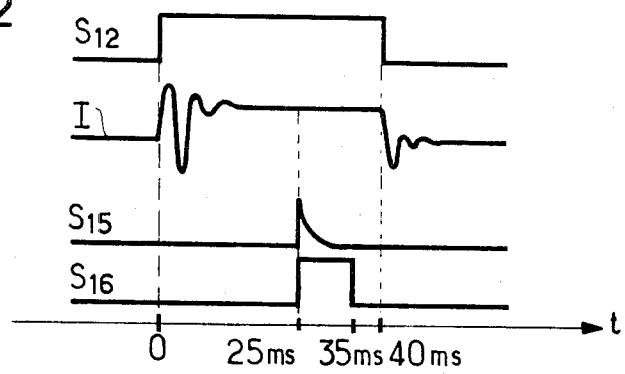
FIG. 2 shows wave forms at various points of the circuitry of FIG. 1.

FIG. 2 shows the output $S_{12}$ of the monostable circuit 12 and the resulting additional current I passing through the storage battery 4 in response to the connection of the shunt resistance 14. This current pulse I has transient effects at both its leading and trailing edges. The output of the delay and differentiating circuit 15 is shown at $S_{15}$. It is applied to the input of another monostable circuit 16 which is arranged to provide an output pulse whose duration is such that when added to the delay of circuit 15 the resulting total is less than the current pulse duration. The output of monostable circuit 16 is shown at $S_{16}$ in FIG. 2, and it is seen that the output pulse of this monostable circuit lies wholly within that part of the current pulse I which is not subject to transient phenomena. The times values given along the ordinate of FIG. 2 are given purely by way of example.

The output of monostable circuit 16 is applied to a second input of the AND-gate 17 previously referred to. The output of this AND-gate is applied to the control element 7, which receives the output voltage of the third operational amplifier 26 during the output pulse of monostable 16.

The third sub-section 3 includes a voltage regulator 30 connected to the negative pole of the storage battery 4. The constant output voltage of the regulator 30 is applied to a voltage divider 31, and a portion tapped off from the divider is applied to a first input of a fourth operational amplifier 32. The second input of this amplifier is connected to ground and a heat-sensitive resistance 33 is connected between the output of the amplifier 32 and its first input. The resistance 33 is, when the apparatus is in use, immersed in the electrolyte of the storage battery 4, serving to compensate for temperature variations in the electrolyte.

The output of amplifier 32 is connected to a first input of a fifth operational amplifier 34, this input being also connected to the positive pole of the storage battery 4. The other input of amplifier 34 is connected to ground. The output of amplifier 34 is applied to the control unit 8 whose output is applied through a delay circuit 35 to a corresponding input of the recharging circuit 6.

The apparatus operates as follows.

The coil 10, switch 11, monostable circuit 12, switching element 13 and shunt resistance 14 make up drive circuitry connected across the first and second terminals of the apparatus. The drive circuitry is connected respectively to the negative and positive poles of the storage battery 4, this first circuitry being arranged to apply the current pulses to the storage battery. The amplifier 20, switch 21 and voltage storing device 22 make up sensing circuitry for detecting the voltage output of storage battery 4 and evaluating a first signal indicative of the difference between this voltage before and during each current pulse. This first signal is the output voltage $\Delta V$ of the amplifier 20.

The voltage regulator 23, voltage divider 24 and amplifier 25 make up reference circuitry providing a reference signal in the form of the output voltage $V_s$ of the amplifier 25. Comparator circuitry in the form of the amplifier 26 receives the first signal $\Delta V$ and compares it with the reference signal $V_s$.

If the output signal of the amplifier 26 indicates that the battery charge has reached a predetermined minimum level, the control element 7 starts the operation of the recharging device 6 to recharge the storage battery.

The voltage regulator 30, voltage divider 31, amplifier 32 with associated resistance 33, and amplifier 34 make up a circuit for monitoring the charge and stopping operation of the charging device 6 when the storage battery is again fully charged. The fully charged state is fairly accurately defined by the voltage between poles of the storage battery.

The delay circuit 35 enables the end of discharge to be delayed by a predetermined amount, thereby producing a slight overcharge of the storage battery. This can be advantageous in producing mixing of the electrolyte where this is a liquid.

The apparatus just described is particularly useful where automatic control of the state of charge of a storage battery is required, supervision by an operator being inconvenient or even impossible. Such applications occur for example, in the case of buoys and lighthouses whose electrical supply is provided by a bank of storage batteries and periodic checking by an operator is extremely inconvenient if not impossible.

It will be appreciated that the recharging device 6 and its control circuit 3 may be dispensed with in applications where the only requirement is to indicate the state of charge of the storage battery. Where it is sufficient merely to disconnect the storage battery when fully discharged, the output of the AND-gate 17 may be applied to an appropriate circuit for effecting the disconnection.

While the invention has been particularly shown and described with reference to the preferred embodiment thereof, it will be understood by those skilled in the art that various changes in form and details may be made therein without departing from the spirit and scope of the invention.

We Claim:

1. Apparatus for monitoring the state of charge of a storage battery, comprising:
   a. first and second terminals connected to the poles of said storage battery while said storage battery is connected to a load circuit; drive circuit means connected across said first and second terminals for applying current pulses of predetermined duration to said storage battery at predetermined regular intervals;
   b. sensing circuit means connected across said first and second terminals for sensing the voltage across said first and second terminals and for generating a first signal indicative of the difference between said voltage before and during each said current pulse; comparator circuit means connected to receive the first signal and for comparing it with a reference signal generated by a reference circuit means, the output signal of the comparator circuit means during each current pulse being indicative of the state of charge of said storage battery.

2. Apparatus as claimed in claim 1, further comprising indicator circuit means for receiving the output signal of said comparator circuit means and for providing an indication of the state of charge of said storage battery.

3. Apparatus as claimed in claim 1, wherein the sensing circuit means includes a first operational amplifier having a first input connected to said second terminal and a second input connected to a voltage storing element, a first switching element, said first switching element connected between said voltage storing element and second terminal, said first switching element being closed between current pulses whereby the voltage at said second terminal is applied to first and second inputs of said first operational amplifier and to said voltage storing device, and said first switching element being open during each current pulse whereby the voltage at said second terminal is applied to said first input of the first operational amplifier and the stored voltage is applied to said second input of said first operational amplifier.

4. Apparatus as claimed in claim 3, wherein the voltage storing element is a capacitor comprising a third terminal connected to said second input of said first operational amplifier and a fourth terminal connected to ground.

5. Apparatus as claimed in claim 1, wherein said reference circuit means is connected to said first terminal for receiving said storage battery output voltage, said reference circuit means comprising a voltage regulator means for providing a constant output voltage and a voltage divider whereby the output of said regulator is applied to said voltage divider, the output of said voltage divider being applied to one input of a second operational amplifier.

6. Apparatus as claimed in claim 1, wherein said comparator circuit means comprises a third operational amplifier means for operating as a saturated comparator.

7. Apparatus as claimed in claim 1, wherein said drive circuit means includes a second switching element closed at moments coincident with the start of each successive current pulse, said second switching element energizing a first monostable circuit whose output pulse is applied to a third switching element, said third switching element connecting a shunt resistance between said first and second terminal for the duration of the output pulse of the first monostable circuit, said first monostable circuit thereby defining the current pulse duration.

8. Apparatus as claimed in claim 1, further comprising logic circuit means including:
  a. delay circuit means connected for receiving signals coincident with the start of each current pulse and for providing successive trigger signals delayed with respect to the current pulse by an amount less than the current pulse duration;
  b. a second monostable circuit means triggered by each trigger signal for providing an output pulse whose duration is such that the sum of the delay of the delay circuit means and the duration of said output pulse is less than the current pulse duration; and gate circuit means for receiving the output of said comparator circuit means and the output of said monostable circuit means and for producing an output only when both said comparator circuit means and said second monostable circuit means produce a simultaneous output.

9. Apparatus as claimed in claim 1, further comprising control circuit means for controlling the state of charge of the storage battery, said control circuit including a recharging device connected to receive the output of said comparator circuit means, said recharging device operating when said comparator circuit means indicates a predetermined state of charge; and a storage battery charge sensor means for detecting when said storage battery is fully charged and for stopping the operation of said recharging device when said storage battery is fully charged.

10. Apparatus as claimed in claim 9, wherein said storage battery charge sensor means compares the voltage at said first terminal with a reference voltage.

11. Apparatus as claimed in claim 10 wherein the reference voltage is generated by a circuit including a voltage regulator means for receiving the storage battery output voltage and for providing a constant output voltage, a voltage divider circuit, a fourth operational amplifier, said fourth operational amplifier having a heat-sensitive resistance connected between its output and its first input, said heat-sensitive resistance being surrounded, during use of said apparatus, by an electrolyte of said storage battery wherein said voltage regulator means is connected to said voltage divider circuit, and the output of said voltage divider circuit is connected to the first input of said fourth operational amplifier and wherein a second input to said fourth operational amplifier is connected to ground.

12. Apparatus as claimed in claim 10 wherein a fifth operational amplifier means for operation as a saturated comparator compares the output voltage of said storage battery and the reference voltage.

* * * * *